Oct. 10, 1961     E. D. OSTROFF     3,004,249
SIGNAL RESPONSIVE APPARATUS
Filed Jan. 7, 1959
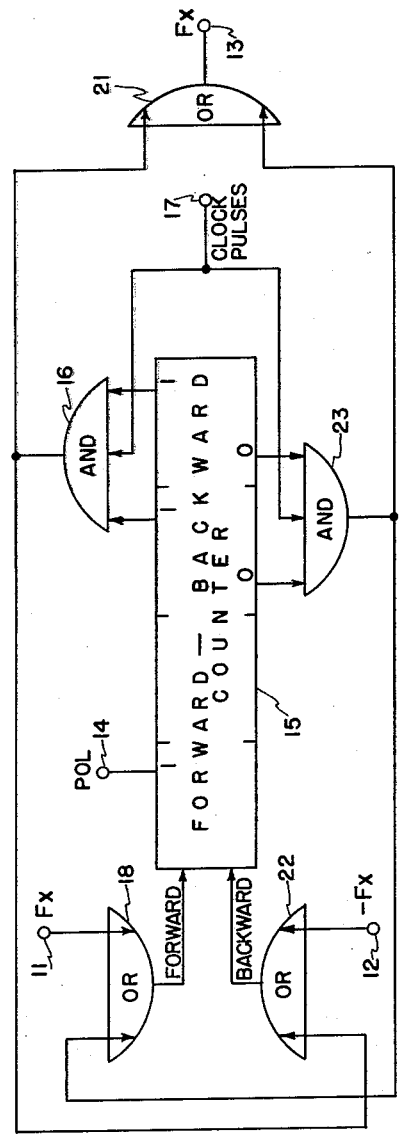
INVENTOR.
EDWARD D. OSTROFF
BY
*Fred Jacob*
ATTORNEY

United States Patent Office 3,004,249
Patented Oct. 10, 1961

3,004,249
SIGNAL RESPONSIVE APPARATUS
Edward D. Ostroff, South Sudbury, Mass., assignor to Laboratory For Electronics, Inc., Boston, Mass., a corporation of Delaware
Filed Jan. 7, 1959, Ser. No. 785,484
5 Claims. (Cl. 340—248)

The present invention relates in general to data signal processing and more particularly concerns apparatus for converting a first signal having a pulse rate characteristic of positive values of a quantity and a second signal having a pulse rate characteristic of negative values of said quantity into an output signal having a pulse rate corresponding to the magnitude of said quantity together with an indication of its polarity. This conversion is accomplished rapidly and accurately with apparatus relatively free from complexity. Moreover, the output signal may be synchronized with system clock pulses during the conversion so that it may be operated upon immediately by an associated computing system.

In operational digital computing systems, such as described in a paper entitled Special-Purpose Digital Data-Processing Computers presented at the Pittsburgh meeting of the Association for Computing Machinery, at the Mellon Institute, May 2 and 3, 1952, by Bernard M. Gordon and Renato N. Nicola, it is desirable to represent certain quantities by pulse rates. However, it is frequently necessary to represent positive and negative values of the same quantity by pulse trains occurring on separate lines. For certain computations it is advantageous to have available a single pulse train having a rate characteristic of the magnitude of the quantity together with an indication of its polarity.

Accordingly, the present invention contemplates and has as a primary object converting first and second signals occurring on separate lines and having rates characteristic of positive and negative values of a quantity into an output signal provided on a single line having a rate characteristic of the magnitude of the quantity and a separate indication of the polarity of the quantity.

It is another object of the invention to synchronize the output signal provided in accordance with the preceding object with external clock pulses during the conversion process so that the output signal provided is immediately available for being operated upon by an associated computing system.

It is still a further object of the invention to realize the above objects with a high degree of reliability, while minimizing the complexity of the apparatus for effecting the conversion.

According to the invention, first and second input lines for receiving the pulse trains are coupled to means arranged to differentially combine signals applied to said input lines and provide first and second gate enabling signals during mutually exclusive time intervals when the first and second input lines, respectively, are then energized. The first and second gate enabling signals are applied to first and second gating means, respectively, to enable these gates to pass clock pulses to a common output terminal. The state of the differential combining means is sensed to provide an indication of which of the input lines is then energized.

Other features, objects and advantages of the invention will become apparent from the following specification when read in connection with the accompanying drawing, the single figure of which shows a block diagram illustrating the logical arrangement of the apparatus.

Referring now to the drawing, the first and second signals having pulse rates respectively representative of positive and negative values of the quantity $F_X$ are applied to terminals 11 and 12 respectively to provide a rate on output terminal 13 characteristic of the magnitude of the quantity and a potential level on output polarity terminal 14 indicative of the sense of the quantity $F_X$. The latter terminal is conditioned when the first stage of a reversible counter 15 stores the bit One, indicating that $F_X$ is negative.

A four-stage reversible forward-backward counter 15 stores a count which is advanced and retarded by signal pulses applied to its forward and backward inputs, respectively. A gate 16 is enabled to pass clock pulses applied to terminal 17 when the last two digits of the stored count are 11. A gate 23 is enabled to pass such clock pulses when the last two digits of the stored count are 00. Clock pulses passed by gates 16 and 23 are coupled to output terminal 13 by buffer 21.

The output of gate 23 and the first signal applied on terminal 11 are coupled to the forward line of counter 15 through buffer 18. The output of gate 16 and the second signal applied on terminal 12 are coupled to the backward input of counter 15 through buffer 22.

Operation is as follows: When the quantity $F_X$ is positive, pulses are applied to terminal 11, causing forward-backward counter 15 to count in the forward direction until the four-stage counter stores a binary count of 0011. This raises the potential on polarity output terminal 14, indicating that the quantity is positive and enables gate 16 to pass the next clock pulse applied on terminal 17. The rate of the clock pulses applied to terminal 17 is higher than the highest rate which will occur on either of terminal 11 or 12; therefore, a clock pulse will occur before the next input pulse.

The next clock pulse is then passed by gate 16 through buffer 21 to output terminal 13. It is also applied through buffer 22 to the backward input of forward-backward counter 15, retarding the count therein by one to 0010, thereby disabling gate 16. The next input pulse applied to terminal 11 is then passed by buffer 18 to the forward input of forward-backward counter 15 to advance the count back to 0011 whereby the previous cycle is repeated and another clock pulse is passed to output terminal 13.

If the quantity $F_X$ becomes negative, pulses are applied to terminal 12 and through buffer 22 to the backward lead of counter 15, causing the counter to count backwards until a count of 1100 is stored. At this time, gate 23 is enabled to pass the next clock pulse applied on terminal 17 to output terminal 13 through buffer 21. At the same time, the potential on polarity output terminal 14 is low, indicating that the quantity is negative.

The following chart shows the counts successively stored by the counter, the count changing to a value immediately below when counting forward and to a value immediately above when counting backward. Note that positive polarity will be indicated for the bottom eight values while negative polarity is indicated for the top eight.

```
1 1 1 1
1 1 1 0
1 1 0 1
1 1 0 0   gate 23 enabled
1 0 1 1

1 0 1 1
1 0 1 0
1 0 0 1
1 0 0 0
0 1 1 1
0 1 1 0
0 1 0 1
0 1 0 0

0 0 1 1   gate 16 enabled
0 0 1 0
0 0 0 1
0 0 0 0
```

The clock pulse passed by gate 23 is also delivered through buffer 18 to the forward input of counter 15, thereby advancing the count by one to 1101 and disabling gate 23. The next pulse applied to terminal 12 retards the count in counter 15 back to 1100 and gate 23 is again enabled to pass the next clock pulse to output terminal 13.

The use of four stages in counter 15 prevents the system from responding to a short burst of pulses on one input line interleaved between consecutive pulses on the other line then energized by the pulse train denoting the predominant polarity. While a number of stages greater than two is preferred for this reason, the invention is operable with only two stages, the polarity indication again being derived from the first of the stages storing the most significant digit.

The invention is especially useful as an adder in an operational digital computing system wherein quantities are represented by pulse rates. All signals representative of positive values are applied to terminal 11 while those representative of negative values are applied to terminal 12, the positive-valued signals and negative-valued signals first being synchronized so that pulses do not occur coincidentally.

It is apparent that numerous other departures from and modifications of the specific embodiment described herein may be practiced by those skilled in the art without departing from the inventive concepts. Consequently, the invention is to be construed as limited only by the spirit and scope of the appended claims.

What is claimed is:

1. Apparatus for providing an output signal having a rate corresponding to the rate of first and second input signals applied to first and second input lines respectively during mutually exclusive time intervals together with a polarity signal indicative of which of said lines is then energized comprising, a reversible counter arranged with forward and backward inputs coupled to said first and second lines respectively, the count in said counter being advanced in response to said first input signal and retarded in response to said second input signal, first and second gating means enabled during mutually exclusive time intervals corresponding to said first and second input lines being energized respectively and in response to different counts in said counter, a source of clock pulses having a rate greater than the rate of said first and second input signals, means for coupling said clock pulses to said output terminal through the enabled one of said gating means, and means for providing an indication of the most significant digit of said count to indicate which of said input lines is then energized.

2. Apparatus in accordance with claim 1 and further comprising means for applying said clock pulses passed by said first and second gating means to said backward and forward inputs respectively.

3. Electrical apparatus comprising, a reversible counter having a plurality of cascaded stages, a forward input and a backward input for storing a count which is advanced in response to each pulse applied to said forward input and retarded in response to each pulse applied to said backward input, first and second gating means coupled to at least the last two of said stages and arranged to be enabled during mutually exclusive time intervals in response to different values of said count, an output terminal, a clock pulse terminal coupled to both said gating means and arranged to receive clock pulses which are passed to said output terminal through the enabled one of said gating means, first and second input lines arranged to receive first and second input signal respectively, first and second buffer means for coupling said first input line and said second gating means output to said forward input and said second input line and said first gating means output to said backward input respectively, and a polarity output terminal coupled to one of said stages before the last stage for receiving a signal indicative of the state of said one stage.

4. Electrical apparatus comprising, a reversible counter having a plurality of cascaded stages greater than two, a forward input and a backward input for storing a count which is advanced in response to each pulse applied to said forward input and retarded in response to each pulse applied to said backward input, first and second gating means coupled to at least the last two of said stages and arranged to be enabled during mutually exclusive time intervals when said last two stages store all Ones and all Zeros respectively, an output terminal, a clock pulse terminal coupled to both said gating means and arranged to receive clock pulses which are passed to said output terminal through the enabled one of said gating means, first and second input lines arranged to receive first and second input signals respectively, first and second buffer means for coupling said first input line and said second gating means output to said forward input and said second input line and said first gating means output to said backward input respectively, and a polarity output terminal coupled to the first of said cascaded stages for receiving a signal indicative of the state of said one stage.

5. Apparatus for providing an output signal recurring at a rate related to the rate of first and second input signals applied during mutually exclusive times to respective first and second input lines, comprising, a forward-backward counter having its forward and backward inputs coupled respectively to the first and second input lines, a source of clock pulses, the clock pulses having a rate exceeding the highest rate of either the first or the second input signals, first and second gates having the clock pulse source coupled to inputs thereof, means coupling the outputs of the first and second gates to an output terminal, the counter having means providing gate enabling signals to one of the gates when the count attains one value and providing gate enabling signals to the other gate when the count attains a second value, means separately coupling the outputs of the first and second gates to different ones of the first and second input lines, and means for obtaining a polarity signal from the counter indicative of the sense of the count therein.

References Cited in the file of this patent

UNITED STATES PATENTS

| | | |
|---|---|---|
| 2,656,106 | Stabler | Oct. 20, 1953 |
| 2,680,241 | Gridley | June 1, 1954 |
| 2,788,519 | Caldwell | Apr. 9, 1957 |

FOREIGN PATENTS

| | | |
|---|---|---|
| 975,941 | France | Oct. 17, 1950 |